United States Patent
Kuo et al.

(10) Patent No.: US 10,044,528 B2
(45) Date of Patent: Aug. 7, 2018

(54) EQUALIZER APPARATUS AND VITERBI ALGORITHM BASED DECISION METHOD

(71) Applicant: MStar Semiconductor, Inc., Hsinchu Hsien (TW)

(72) Inventors: Chih-Cheng Kuo, Hsinchu Hsien (TW); Wen-Chieh Yang, Hsinchu Hsien (TW); Tai-Lai Tung, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/196,223

(22) Filed: Jun. 29, 2016

(65) Prior Publication Data

US 2017/0257232 A1     Sep. 7, 2017

(30) Foreign Application Priority Data

Mar. 2, 2016   (TW) .............................. 105106290 A

(51) Int. Cl.
  *H04L 25/03*  (2006.01)
  *H04L 27/36*  (2006.01)

(52) U.S. Cl.
  CPC ........ *H04L 25/03019* (2013.01); *H04L 27/36* (2013.01)

(58) Field of Classification Search
  CPC ............... H04L 25/03057; H04L 27/01; H04L 25/03146; H04L 2025/0349; H04L 1/0054; H04L 2025/03592; H04L 2025/03675; H04L 25/03019; H04B 10/6971; H04B 7/0417

USPC .................................................. 375/229–232
See application file for complete search history.

(56) References Cited

U.S. PATENT DOCUMENTS

| | | | | |
|---|---|---|---|---|
| 5,031,194 A * | 7/1991 | Crespo | ............... | H03H 21/0012 333/28 R |
| 5,052,000 A * | 9/1991 | Wang | .................... | H04L 1/0047 375/233 |
| 5,550,810 A * | 8/1996 | Monogioudis | ....... | H04B 1/7107 370/342 |
| 5,602,602 A * | 2/1997 | Hulyalkar | ................ | H04N 5/21 348/21 |
| 5,648,822 A * | 7/1997 | Hulyalkar | ......... | H03M 13/1515 348/21 |
| 5,757,855 A * | 5/1998 | Strolle | .............. | H04L 25/03267 375/262 |
| 5,841,484 A * | 11/1998 | Hulyalkar | .............. | H04N 5/211 348/607 |
| 6,094,316 A * | 7/2000 | Pham | ....................... | G11B 5/02 360/25 |
| 6,201,832 B1 * | 3/2001 | Choi | ................ | G11B 20/10009 360/51 |

(Continued)

*Primary Examiner* — Emmanuel Bayard
(74) *Attorney, Agent, or Firm* — Edell, Shapiro & Finnan, LLC

(57) ABSTRACT

An equalizer apparatus includes a feedforward filter, a slicer circuit and a feedback circuit. The feedforward filter processes an input signal. The slicer circuit includes a Viberbi decoding circuit coupled to the feedforward filter, and performs a Viberbi algorithm based decision operation to generate a decision signal according to an output signal of the feedforward filter and a feedback signal of the feedback filter. The feedback filter generates the feedback signal according to the decision result signal.

14 Claims, 7 Drawing Sheets

(56) References Cited

U.S. PATENT DOCUMENTS

| | | | | |
|---|---|---|---|---|
| 6,370,191 B1* | 4/2002 | Mahant-Shetti | ........ | G06F 7/552 375/233 |
| 6,671,314 B1* | 12/2003 | Abe | ...................... | H04L 1/0054 375/233 |
| 6,671,338 B1* | 12/2003 | Gamal | .................. | H04L 1/0048 375/144 |
| 6,690,723 B1* | 2/2004 | Gosse | ............... | H04L 25/03057 375/233 |
| 6,760,372 B1* | 7/2004 | Zortea | .................. | H04L 7/0334 375/232 |
| 6,775,334 B1* | 8/2004 | Liu | ........................... | H04B 1/68 348/E11.002 |
| 6,791,995 B1* | 9/2004 | Azenkot | ................ | H04B 1/707 348/E5.008 |
| 6,934,345 B2* | 8/2005 | Chu | ...................... | H04L 1/0054 375/232 |
| 7,020,212 B1* | 3/2006 | Strait | .................. | H04L 27/2649 375/219 |
| 7,130,344 B2* | 10/2006 | Xia | ........................ | H04L 1/0054 375/233 |
| 7,139,312 B2* | 11/2006 | Graumann | ........ | H03M 13/4169 375/233 |
| 7,266,146 B2* | 9/2007 | Pare, Jr. | .................. | H04L 23/02 375/232 |
| 7,706,436 B2* | 4/2010 | Zhidkov | ............... | H04L 1/0054 375/229 |
| 7,738,603 B2* | 6/2010 | Zhidkov | ............... | H04L 1/0047 348/432.1 |
| 7,764,732 B2* | 7/2010 | Rollins | ............. | H04L 25/03057 375/233 |
| 8,045,606 B2* | 10/2011 | Oh | .................... | H04L 25/03057 375/229 |
| 8,279,969 B2* | 10/2012 | Betts | ..................... | H04L 1/0006 375/265 |
| 8,307,267 B2* | 11/2012 | Venkataramani | ........................ | G11B 20/10009 714/795 |
| 8,560,900 B1* | 10/2013 | Bellorado | ........ | G11B 20/10268 703/25 |
| 8,891,709 B2* | 11/2014 | Kolze | ............... | H04L 25/03019 375/229 |
| 8,938,035 B1* | 1/2015 | Dai | ........................ | H04L 1/0054 375/229 |
| 9,167,270 B2* | 10/2015 | Lin | ...................... | H04N 19/176 375/341 |
| 2001/0009565 A1* | 7/2001 | Singvall | ............ | H04L 25/03057 375/233 |
| 2002/0034219 A1* | 3/2002 | Agazzi | ............... | G01R 31/3004 375/219 |
| 2006/0120475 A1* | 6/2006 | Zhidkov | ............. | H04L 1/0047 375/265 |
| 2007/0183489 A1* | 8/2007 | Zhidkov | ............. | H03M 13/256 375/229 |
| 2008/0260017 A1* | 10/2008 | Tsuie | ................ | H04L 25/03057 375/233 |
| 2009/0213907 A1* | 8/2009 | Bottomley | ........ | H04L 25/03203 375/148 |
| 2009/0296802 A1* | 12/2009 | Ermolayev | ........... | H04L 1/0054 375/233 |
| 2010/0135372 A1* | 6/2010 | Agazzi | ............... | G01R 31/3004 375/219 |
| 2011/0164517 A1* | 7/2011 | Shepherd | ............... | H04B 1/707 370/252 |
| 2013/0034145 A1* | 2/2013 | Li | ..................... | H04L 25/03057 375/233 |
| 2014/0362942 A1* | 12/2014 | Wood | .................... | H04B 15/00 375/267 |
| 2016/0088593 A1* | 3/2016 | Davydov | ............ | H04W 72/042 370/329 |
| 2016/0219457 A1* | 7/2016 | Nammi | ................ | H04B 1/1036 |

* cited by examiner

US 10,044,528 B2

EQUALIZER APPARATUS AND VITERBI ALGORITHM BASED DECISION METHOD

This application claims the benefit of Taiwan application Serial No. 105106290, filed Mar. 2, 2016, the subject matter of which is incorporated herein by reference.

BACKGROUND OF THE INVENTION

Field of the Invention

The invention relates in general to an equalizing mechanism, and more particularly to an equalizer apparatus and a Viberbi algorithm based decision method.

Description of the Related Art

In general, the architecture of an equalizer at a receiver in a conventional communication system is based on a hard decision mechanism. The hard decision mechanism determines a received signal is which symbol according to a decision border and outputs a corresponding signal level. However, the hard decision mechanism suffers from certain severe issues. For example, once a decision error occurs (e.g., due to an excessively large channel noise or multipath fading effect), the accumulated amount of misjudgment may affect subsequent decisions, hence exposing the overall system to higher collapsing risks and instability.

SUMMARY OF THE INVENTION

It is an object of the present invention to provide a Viterbi algorithm based equalizer apparatus and a corresponding decision method capable of selecting whether to utilize a Viberbi decision result as an output, so as to solve the issue of an excessive amount of accumulated errors caused by misjudgment in a conventional decision mechanism.

An equalizer apparatus is disclosed according to an embodiment of the present invention. The equalizer apparatus includes a feedforward filter, a slicer circuit and a feedback filter. The feedforward filter processes an input signal. The slicer circuit includes a Viterbi decoding circuit coupled to the feedforward filter, and performs a Viterbi algorithm based decision operation according to an output signal of the feedforward filter and a feedback signal to generate a decision result signal. The feedback filter is coupled to the slicer circuit, and generates the feedback signal according to the decision result signal.

A decision method for an equalizer apparatus is further disclosed according to another embodiment of the present invention. The decision method includes: processing an input signal by a feedforward filter; performing a Viterbi algorithm based decision operation according to an output signal of the feedforward filter and a feedback signal to generate a decision result signal; and generating the feedback signal according to the decision result signal by a feedback filter.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
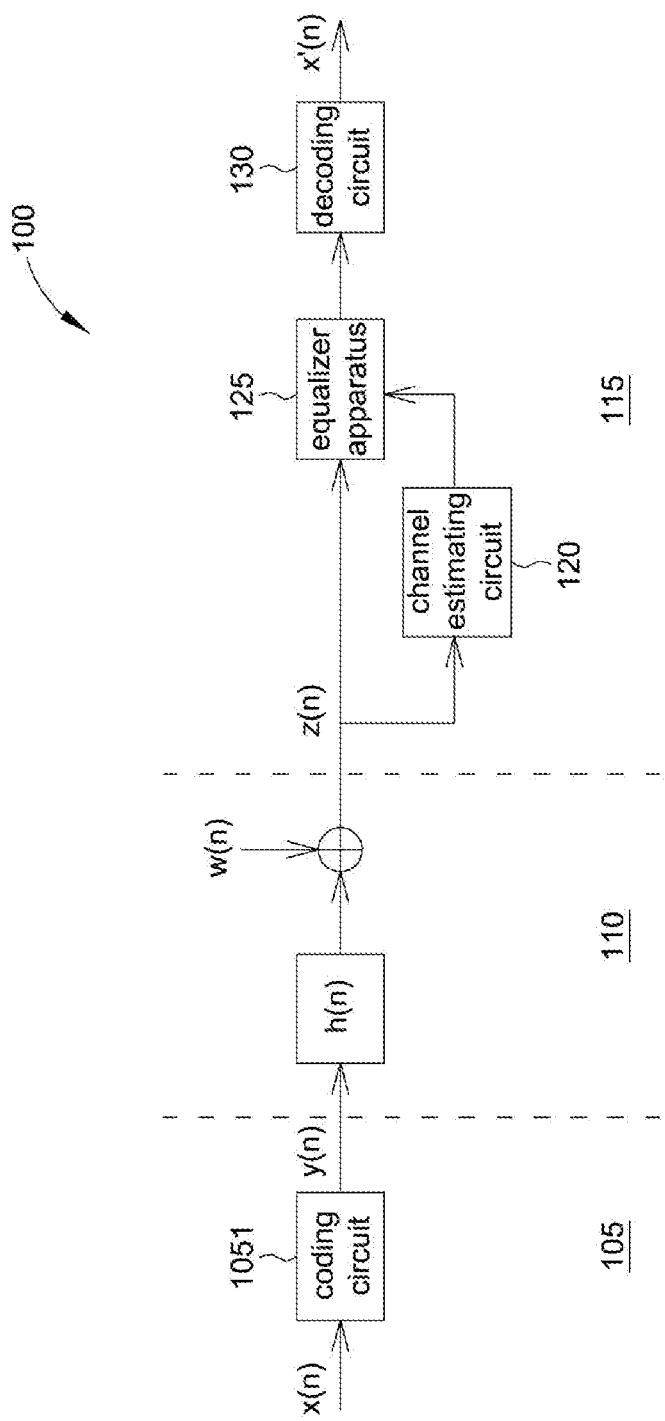
FIG. 1 is a schematic diagram of a communication system according to an embodiment of the present invention.

FIG. 1 shows a schematic diagram of a communication system 100 according to an embodiment of the present invention. The communication system 100 includes a transmitter 105, a channel 110 and a receiver 115. The receiver 115 includes a channel estimating circuit 120, an equalizer apparatus 125 and a decoding circuit 130. The transmitter 105 performs coding (e.g., forward error correction (FEC) coding) on an information signal x(n) by a coding circuit 1051 to generate a coded signal y(n), and transmits the coded signal y(n) to the channel 110. The signal y(n) is affected by multipath fading (represented as h(n)) and additional external noise w(n), such that the receiver 115 actually receives a signal z(n). Due to the complexity of multipath fading (particularly severe in wireless communication environments), the information signal x(n) cannot be obtained directly based on the signal z(n). Thus, the channel estimating circuit 120 estimates a channel impulse response by performing channel estimation according to the signal z(n), and outputs the channel estimation result to the equalizer apparatus 125. The equalizer apparatus 125 performs response compensation for the multipath fading on the signal z(n) to reduce the error rate. The decoding circuit 130 then decodes (e.g., by FEC coding) the compensated signal to generate or restore a decoded signal x'(n). In an embodiment of the present invention, the equalizer apparatus 125 adopts a Viberbi algorithm based decision method. As such, in addition to reducing the probability of bit misjudgment through the Viterbi algorithm when performing the feedback response compensation, a Viberbi decision operation result is adaptively selected as an output. Therefore, the equalizer apparatus 125 adopting the Viterbi algorithm based decision method of the present invention provides higher stability while also enhancing the system decision performance.

Figure 2:
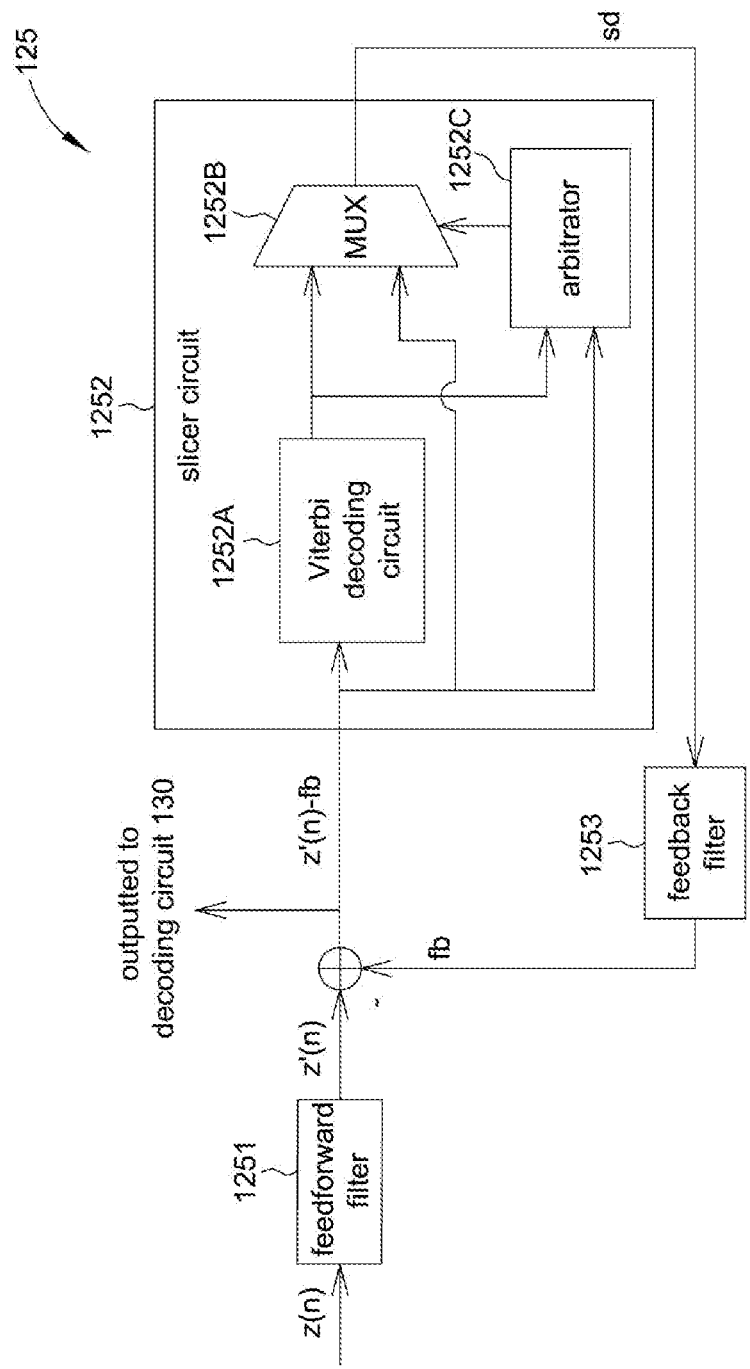
FIG. 2 is a schematic diagram of an equalizer apparatus at a signal receiver in the communication system in FIG. 1 according to an embodiment of the present invention.

FIG. 2 shows a schematic diagram of the equalizer apparatus 125 at the signal receiver in the communication system 100 in FIG. 1. The equalizer apparatus 125 of the present invention adopts a decision feedback equalizer that is suitable in many types of communication structures, e.g., Digital Video Broadcast-Cable (DVB-C), Advanced Television System Committee (ATSC), and Digital Terrestrial Multimedia Broadcast (DTMB). The equalizer apparatus 125 includes a feedforward filter 1251, a slicer circuit 1252 and a feedback filter 1253. The feedforward filter 1251 receives and processes the signal z(n) actually received from the channel 110. Ideally, the signal z(n) corresponds to a modulated symbol signal at the transmitter and is affected by multipath fading and noise during the transmission process. For example, the symbol may be generated through trellis coded modulation (TCM) by the transmitter, and the signal level of the signal z(n) ideally corresponds to the value of the signal level of the symbol signal processed by TCM. The slicer circuit 1252 is coupled to an output end of the feedforward filter 1251, and receives an output signal of the feedforward filter 1251 (i.e., the signal z'(n) processed by the feedforward filter 1251) and a feedback signal fb of the feedback filter 1253, and performs a Viterbi algorithm based decision method according to the output signal z'(n) of the feedforward filter 1251 and the feedback signal fb of the feedback filter 1253 in response to the TCM to generate a decision result signal sd. In practice, the signal z'(n) is subtracted by the feedback signal fb and then transmitted to the slicer circuit 1252 to form an input signal (i.e., z'(n)-fb) of the slicer circuit 1252. Alternatively, the slicer circuit 1252 may first receive the signal z'(n) and the feedback signal fb, and subtract the feedback signal fb from the signal z'(n) by an internal circuit operation and then accordingly perform the soft decision operation. The feedback filter 1253 is coupled to an output end of the slicer circuit 1252, and generates the feedback signal fb according to the decision result signal sd to the slicer circuit 1252. For example, the slicer circuit 1252 determines the symbol signal corresponding to the signal y(n) according to the actual signal amplitude of the signal z'(n) processed by the feedforward filter 1251 and the level of the feedback signal fb, and outputs the signal level value ideally corresponding to the symbol signal. It should be noted that, the Viterbi algorithm based soft decision of the equalizer apparatus 125 of the present invention is applicable to different modulation mechanisms, and is not limited to TCM.

The slicer circuit 1252 includes a Viterbi decoding circuit 1252A, a multiplexer (MUX) 125B and an arbitrator 1252. The Viterbi decoding circuit 1252A receives the signal z'(n)-fb and determines at which signal level value in which set of candidate constellation points the position of the ideal signal level value of the signal y(n) falls according to the signal z'(n)-fb through the Viterbi algorithm shown in FIG. 3C, and outputs the determined signal level value. The arbitrator 1252C receives the signal z'(n)-fb and the output of the Viterbi decoding circuit 1252A, and instructs and controls the multiplexer 1252B to select one of the signal z'(n)-fb and the output of the Viterbi decoding circuit 1252A as the output of the slicer circuit 1252. The arbitrator 1252C adaptively controls the multiplexer 1252B whether to select the Viterbi decision result as the output of the slicer circuit 1252.

Figure 3A:
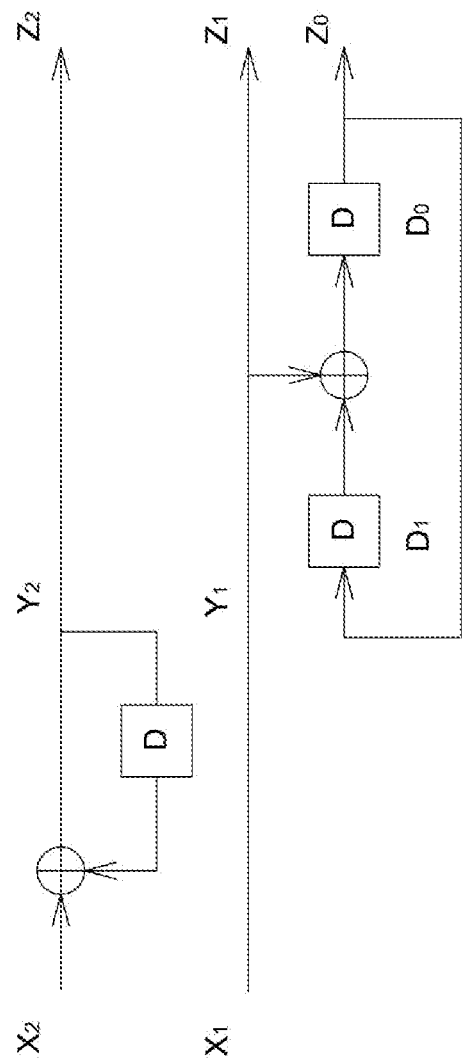
FIG. 3A is a schematic diagram of an example of trellis coded modulation (TCM) with a 2/3 code rate adopted by the Advanced Television Systems Committee (ATSC)
Figure 3B:
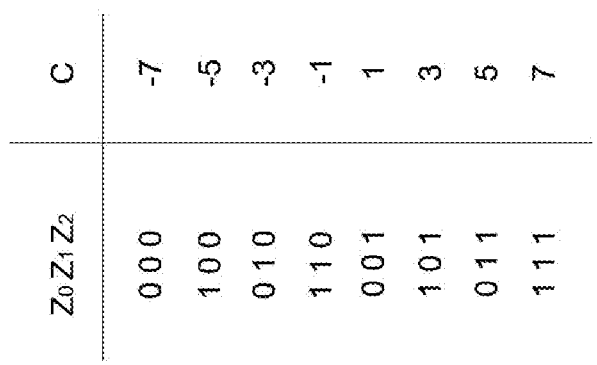
FIG. 3B is a one-dimensional constellation diagram and corresponding signal levels of the trellis coded modulation in FIG. 3A.
Figure 3C:
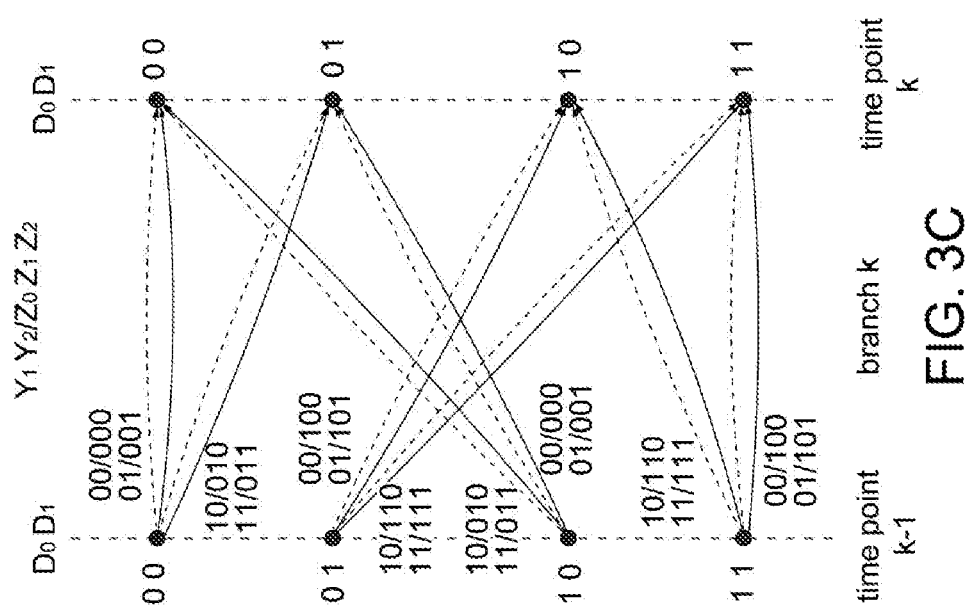
FIG. 3C is a schematic diagram illustrating a Viterbi algorithm correspondingly used by the trellis coded modulation according to FIG. 3A.

FIG. 3A shows a schematic diagram of trellis coded modulation (TCM) with a 2/3 code rate adopted by the ATSC. In the diagram, $X_1$ and $X_2$ represent input bits, $Y_1$ and $Y_2$ represent information bits, $Z_0$ to $Z_2$ represent output bits, and $D_0$ and $D_1$ represent coding states. Adopting a convolution code having a 1/2 code rate, the TCM codes one input bit $X_1$ to two output bits $Z_0$ and $Z_1$, pre-codes one input bit $X_2$ to $Z_2$, and uses a one-dimensional constellation diagram to represent different output symbols (three output bits $Z_0$ to $Z_2$) through eight different signal levels. FIG. 3B shows a one-dimensional constellation diagram adopted by the TCM and signal level values of corresponding coded symbols. There are eight possible bit combinations for $Z_2$, $Z_1$ and $Z_0$, with these possible combinations respectively corresponding to the signal level values represented by C (respectively represented by eight different values from −7 to 7 as shown in the diagram). FIG. 3C shows a schematic diagram illustrating the corresponding Viberbi algorithm adopted by the Viterbi decoding circuit 1252A in FIG. 2 according to TCM with a 2/3 code rate. In the Viterbi algorithm, by estimating a state of a previous time point backwards from a predetermined time point k (it should be noted that the embodiment of the present invention is not limited to estimating backwards to the time point k-1) and calculating metrics of different paths/branches to obtain a smallest accumulated metric of different paths through comparison, possible candidate output symbols and corresponding metrics under different input bit conditions from the state of the time point k to the state of the time point k-1 may be learned. Taking FIG. 3C for example, assume that "00" or "01" is selected as an optimal coding state ($D_0D_1$) at the time point k. In response to different input bit combinations from the time point k-1 to the time point k, there are four possible output bit combinations for $Z_0Z_1Z_2$, including "000", "010", "001" and "011". Ideally, for the Viterbi algorithm, one of the four bit combinations is selected as the final output symbol. These four bit combinations form a set of candidate symbols. Further, ideally, the final output symbol is not selected from the other four bit combinations. Thus, the other four bit combinations form a set of non-candidate symbols. From the one-dimensional constellation diagram in FIG. 3B, the position of the ideal signal level value of the signal z(n) actually received should fall on one of the signal level values of $\{-7, -3, 1, 5\}$ instead of on any of the signal level values $\{-5, -1, 3, 7\}$. At this point, the set $\{-7, -3, 1, 5\}$ is regarded as a set of candidate constellation points, and the set $\{-5, -1, 3, 7\}$ is regarded as a set of non-candidate constellation points. Conversely, if the optimal state ($D_0D_1$) at the time point k is "10" or "11", from the state at the time point k-1 to the state at the time point k (the branch k), in response to different input bit combinations, there are four possible combinations for the output symbol $Z_0Z_1Z_2$, including "100", "110", "101" and "111". At this point, a set of candidate symbols is formed by the four bit combinations above, whereas a set of non-candidate symbols is formed by the other four bit combinations. From the one-dimensional constellation diagram in FIG. 3B, the position of the ideal amplitude of the signal z(n) actually received should fall on one of the signal level values $\{-5, -1, 3, 7\}$ instead of on any of the signal level values $\{-7, -3, 1, 5\}$. Thus, the set $\{-5, -1, 3, 7\}$ is regarded as a set of candidate constellation points, and the set $\{-7, -3, 1, 5\}$ is regarded as a set of non-candidate constellation points.

In the embodiment, the Viberbi decoding circuit 1252A may perform the Viberbi algorithm in FIG. 3C to select a predetermined state (for determining the optimal state at the time point k) corresponding to a predetermined metric (usually a minimum metric). For example, assuming the optimal state ($D_0D_1$) at the time point k is "10" or "11", the Viterbi decoding circuit 1252A then selects a signal level value from the set $\{-5, -1, 3, 7\}$ corresponding to a predetermined metric (usually a minimum metric) and outputs the selected signal level value as a Viterbi decision result. For example, assuming that the optimal state ($D_0D_1$) is "00" or "01" at the time point k, from the state at the time point k-1 to the state at the time point k, it is seen from the one-dimensional constellation diagram that, the set $\{-7, -3, 1, 5\}$ is one set of candidate constellation points. At this point, if the signal level value corresponding to a predetermined metric (usually a minimum metric) is −7 under the Viterbi algorithm, the Viterbi decoding circuit 1252A outputs the signal level −7 corresponding to $Z_0Z_1Z_2$ in a value 000. Actual operations for outputting a signal level corresponding to a non-candidate constellation point may be referred from FIG. 4A and FIG. 4B.

Figure 4A:
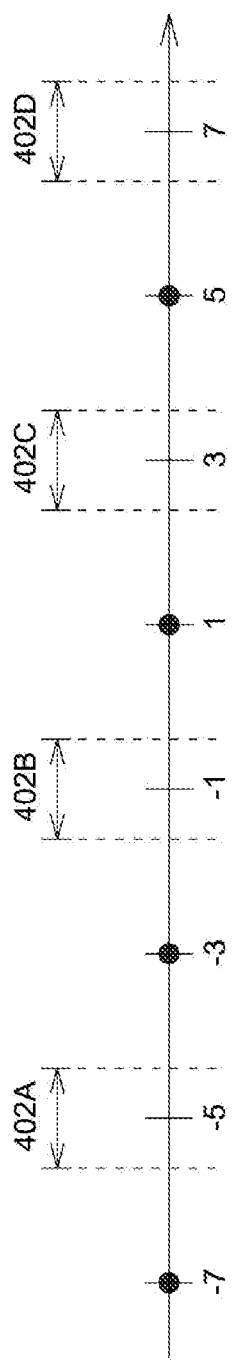
FIG. 4A and FIG. 4B are schematic diagrams of a decision operation performed by an arbitrator according to an embodiment of the present invention.
Figure 4B:
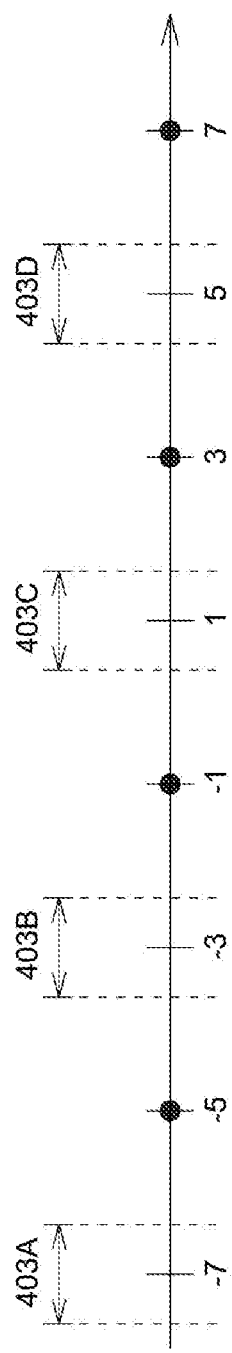

FIG. 4A and FIG. 4B show schematic diagrams of an operation of the arbitrator 1252C. FIG. 4A depicts, under the Viterbi algorithm and when the optimal state at the time point k is "00" or "01", four candidate constellation points corresponding to signal levels $\{-7, -3, 1, 5\}$, four non-candidate constellation points corresponding to signal levels {−5, −1, 3, 7}, and a set of decision intervals (four corresponding signal level intervals) 402A, 402B, 402C and 402D corresponding to the non-constellation points. For example, {−5, −1, 3, 7} are respectively in the middle of the set of corresponding decision intervals 402A, 402B, 402C and 402D. FIG. 4B depicts, under the Viterbi algorithm and when the optimal state at the time point is "00" or "01", four candidate constellation points corresponding to signal levels {−5, −1, 3, 7}, four non-candidate constellation points corresponding to signal levels {−7, −3, 1, 5}, and a set of decision intervals (four corresponding signal level intervals) 403A, 403B, 403C and 403D corresponding to the non-constellation points, with the {−7, −3, 1, 5} respectively being in the middle of the set of corresponding decision intervals 403A, 403B, 403C and 403D. As previously described, the Viterbi decoding circuit 1252A performs a Viterbi algorithm to select a predetermined state (for determining the state at the time point k) corresponding to a predetermined metric (usually a minimum metric), and determines a set of candidate symbols corresponding to the predetermined state and a set of non-candidate symbols not corresponding to the predetermined state. The arbitrator 1252C determines whether a signal amplitude, which is a difference of subtracting the feedback signal fb from the signal z'(n) processed by the feedforward filter 1251 under different state conditions at the time point k, falls in any decision interval of the above set of corresponding decision intervals to determine the decision result signal. For example, in FIG. 4A, under the Viterbi algorithm, when the optimal state at the time point k is "00" or "01", the set {−7, −3, 1, 5} is the candidate constellation points, and the set {−5, −1, 3, 7} is the non-candidate constellation points. The arbitrator 1252C determines whether the signal amplitude falls in any decision interval of the set of decision intervals 402A, 402B, 402C and 402D corresponding to the signal levels {−5, −1, 3, 7} to determine whether to use the Viterbi decision result as the output of the slicer circuit. For example, if the arbitrator 1252C determines that the signal amplitude falls in the decision interval 402A, the arbitrator 1252C generates a control signal to the multiplexer 1252B. According to the control signal, the multiplexer 1252B outputs the signal level corresponding to the Viterbi decision result as the decision result signal. For example, assuming that the signal level corresponding to the Viterbi decision result is −5, and the arbitrator 1252C determines that the signal amplitude does not fall in the decision intervals 402A, 402B, 402C, and 402D, the arbitrator 1252C generates a control signal to the multiplexer 1252B. According to the control signal, the multiplexer 1252C outputs the signal level corresponding to the Viterbi decision result as the decision result signal. For example, assuming that the signal level corresponding to the Viterbi decision result is 1, the multiplexer 1252B outputs the signal level 1. Further, details of the decision intervals of the non-candidate constellation points for different optimal states "10" and "11" at the time point k in FIG. 4 and the corresponding operations are similar to the above description, and shall be omitted herein.

It should be noted that, in the embodiment, the Viterbi decoding circuit 1252A generates a Viterbi decision result, and the arbitrator 1252C may adaptively select the Viterbi decision result of the Viterbi decoding circuit 1252A or a soft decision result as the final decision result signal sd of the slicer circuit 1252. Again referring to FIG. 2, the multiplexer 1252B receives the decision result output of the Viterbi decoding circuit 1252A and the signal level of the signal z'(n)-fb. For example, in FIG. 4A, assuming that the signal level of the signal z'(n)-fb is 6.9 that is closer to the signal level 7 and falls in the decision interval 402D, the arbitrator 1252C in the embodiment controls the multiplexer 1252B to directly adopt the output signal z'(n)-fb from soft decision and having a signal level 6.9 as the decision result signal sd instead of selecting the Viterbi decision result. The arbitrator 1252C may determine whether to select the Viterbi decision result as the output according to the signal level of the signal z'(n)-fb and the decision result of the Viterbi decoding circuit 1252A.

Thus, when the slicer circuit 1252 performs the Viterbi algorithm based decision operation, the Viterbi decoding circuit 1252A first performs a Viterbi algorithm to select a predetermined state (for determining the optimal state at the time point k) corresponding to a predetermined metric (usually a minimum metric), and a set of candidate symbols corresponding to the predetermined state and a set of non-candidate symbols not corresponding to the predetermined state are determined. Next, the arbitrator 1252C determines whether the input signal of the slicer circuit 1252 falls in any decision interval of the set of decision intervals corresponding to the set of non-candidate symbols (i.e., determining whether the input signal is close to constellation points of non-candidate symbols), and adaptively selects with coordination of the multiplexer 1525B whether to use the Viterbi decision result as the decision result signal sd. With the above decision operation, there are chances of selecting a signal level of a non-candidate constellation point as the output under certain conditions, hence reducing the probability of misjudgment as well as the probability of error propagation. In practice, one person skilled in the art may describe the foregoing technology by a hardware description language such as Verilog and then achieve specific functions through digital logic circuits. Such details are omitted herein. In comparison, in the event of a decision error, a conventional hardware decision mechanism is prone to a larger amount of errors due to the misjudgment to further affect the proper function of the feedback filter. Further, the amount of errors accumulated may erroneously cause an update of parameters of the equalizer apparatus. In the present invention, the equalizer apparatus 125 is based on the Viterbi algorithm, and selectively adopts the Viterbi algorithm based decision method. When using the equalizer apparatus 125 of the present invention for feedback response compensation, in addition to reducing the probability of symbol misjudgment through the Viterbi algorithm, the issue of error propagation resulted from decision errors and further causing more decision errors in the event of decision errors can be prevented or alleviated through the design and determination of the arbitrator of the present invention. Therefore, the system is provided with high stability, and is prevented from collapses caused by an excessive effect of multipath fading.

Further, in the description of the present invention, although TCM having a 2/3 code rate is adopted, it should be understood that the TCM is only a possible method for the implementation of the present invention. The corresponding one-dimensional constellation diagram, candidate symbol/constellation point combinations, and non-candidate symbol/constellation points combinations are also examples for explaining the implementation of the present invention, and are not to be construed as limitations to the present invention. One main spirit of the present invention is that, the Viterbi algorithm based decision method is selectively performed by the equalizer apparatus at a receiver to generate the decision result signal. Any modifications made according to such spirit are encompassed within the scope of the present invention. It should be noted that, the present invention is not limited to be necessarily performed in conjunction with soft decision. In other embodiments of the present invention, only the Viterbi algorithm may be adopted as the basis for the decision. That is to say, the multiplexer 1252B and the arbitrator 1252C are optional.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An equalizer apparatus, comprising:
   a feedforward filter, processing an input signal;
   a slicer circuit, comprising a Viterbi decoding circuit coupled to the feedforward filter, performing a decision operation based on a Viterbi algorithm according to an output signal of the feedforward filter and a feedback signal to generate a decision result signal; and
   a feedback filter, coupled to the slicer circuit, generating the feedback signal according to the decision result signal,
   wherein the output signal of the feedforward filter and the feedback signal of the feedback filter form an input signal of the slicer circuit, the slicer circuit first performs the Viterbi algorithm to select a predetermined state corresponding to a predetermined metric, determines a set of candidate symbols corresponding to the predetermined state and a set of non-candidate symbols not corresponding to the predetermined state, and determines whether the input signal of the slicer circuit falls in a set of decision intervals corresponding to the set of non-candidate symbols to perform the decision operation to generate the decision result signal.

2. The equalizer apparatus according to claim 1, wherein the slicer circuit comprises:
   a multiplexer, coupled to the Viterbi decoding circuit, receiving the input signal; and
   an arbitrator, coupled to the Viterbi decoding circuit and the multiplexer, adaptively selecting a Viterbi decision result signal generated by the Viterbi decoding circuit as the decision result signal according to the Viterbi decision result signal and the input signal.

3. The equalizer apparatus according to claim 1, wherein when the input signal of the slicer circuit falls outside the set of decision intervals, the slicer circuit selects a signal level of a neighboring candidate symbol corresponding to the input signal of the slicer circuit from the set of candidate symbols and generates the decision result signal according to the selected signal level.

4. The equalizer apparatus according to claim 1, wherein when the input signal of the slicer circuits falls in a decision interval of the set of decision intervals, the slicer circuit selects a corresponding signal level in the decision interval and generates the decision result signal according to the selected signal level.

5. The equalizer apparatus according to claim 4, wherein the corresponding signal level in the decision interval is a level of the input signal of the slicer circuit.

6. The equalizer apparatus according to claim 4, wherein one symbol of the set of non-candidate symbols corresponds to the decision interval, and the corresponding signal level in the decision interval is a signal level corresponding to the symbol of the set of non-candidate symbols.

7. The equalizer apparatus according to claim 1, wherein the decision operation based on the Viterbi algorithm performed by the slicer circuit performs decision on a signal level value of a trellis coded modulation (TCM) symbol signal.

8. A decision method, applied to an equalizer apparatus, comprising:
   processing an input signal by a feedforward filter;
   performing a decision operation based on a Viterbi algorithm according to an output signal of the feedforward filter and a feedback signal to generate a decision result signal; and
   generating the feedback signal according to the decision result signal by a feedback filter,
   wherein the output signal of the feedforward filter and the feedback signal of the feedback filter form an input signal of the decision operation, and the step of performing the decision operation based on the Viterbi algorithm comprises:
   performing the Viterbi algorithm to select a predetermined state corresponding to a predetermined metric, determining a set of candidate symbols corresponding to the predetermined state and a set of non-candidate symbols not corresponding to the predetermined state; and
   determining whether the input signal of the decision operation falls in a set of decision intervals corresponding to the set of non-candidate symbols to perform the decision operation to generate the decision result signal.

9. The decision method according to claim 8, further comprising:
   determining whether the input signal falls in the set of decision intervals; and
   adaptively selecting the Viterbi decision result signal as the decision result signal according to the Viterbi decision result signal and the input signal.

10. The decision method according to claim 8, wherein the step of determining whether the input signal of the decision operation falls in the set of decision intervals to generate the decision result signal comprises:
    when the input signal of the decision operation falls outside the set of decision intervals, selecting a signal level of a neighboring candidate corresponding to the input signal of the decision operation from the set of candidate symbols, and generating the decision result signal according to the selected signal level.

11. The decision method according to claim 8, wherein the step of determining whether the input signal of the decision operation falls in the set of decision intervals to generate the decision result signal comprises:
    when the input signal of the decision operations falls in a decision interval of the set of decision intervals, selecting a corresponding signal level in the decision interval to generate the decision result signal.

12. The decision method according to claim 11, wherein the corresponding signal level in the decision interval is a level of the input signal of the decision operation.

13. The decision method according to claim 11, wherein one symbol of the set of non-candidate symbols corresponds to the decision interval, and the corresponding signal level in the decision interval is a signal level corresponding to the symbol of the set of non-candidate symbols.

14. The decision method according to claim 8, wherein the decision operation based on the Viterbi algorithm performed by the slicer circuit performs decision on a signal level value of a trellis coded modulation (TCM) symbol signal.

* * * * *